Figure 12:
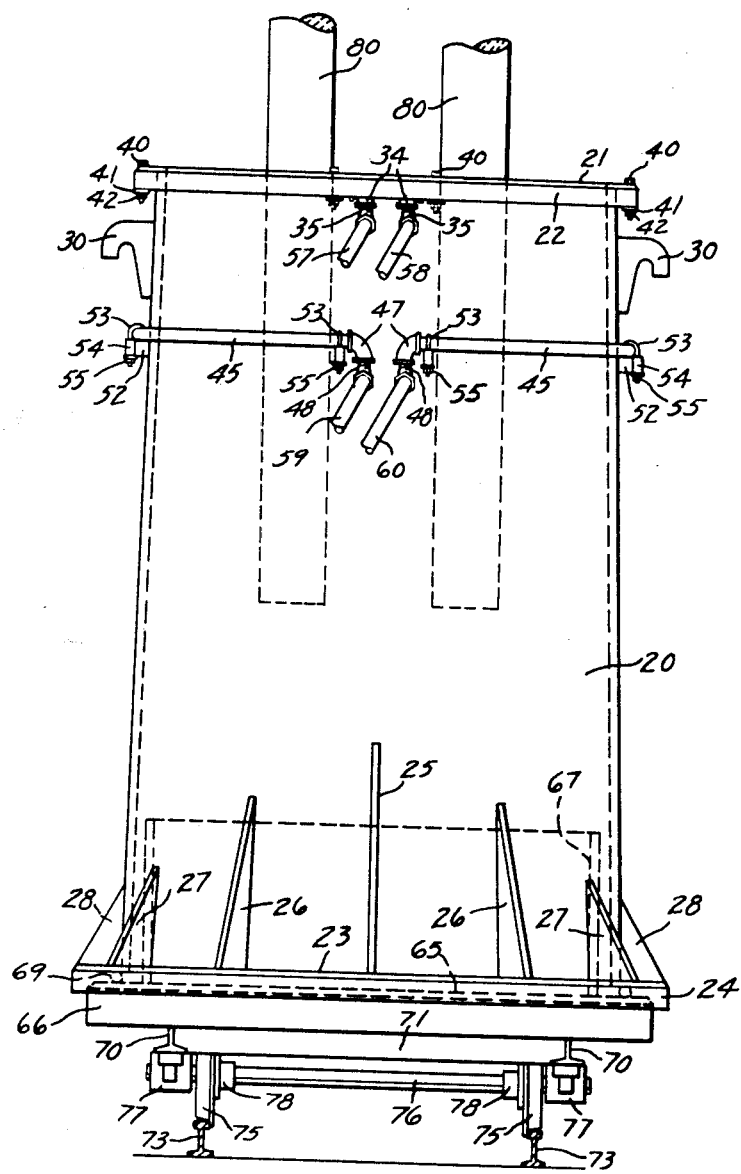

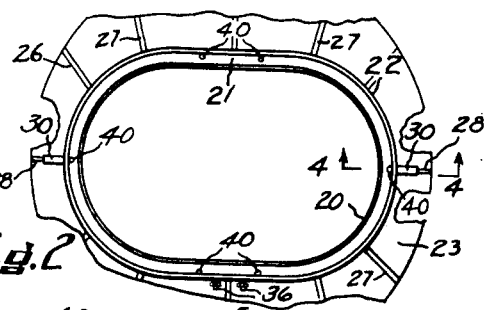

Dec. 15, 1964     J. J. SCOTT     3,161,470
ARC FURNACE PROCESS FOR THE PRODUCTION OF ZIRCONIUM CARBIDE
Filed Feb. 25, 1958     5 Sheets-Sheet 2
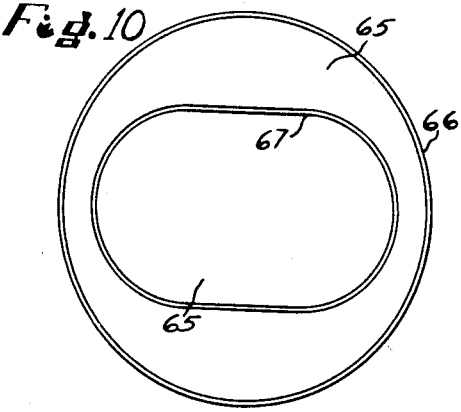
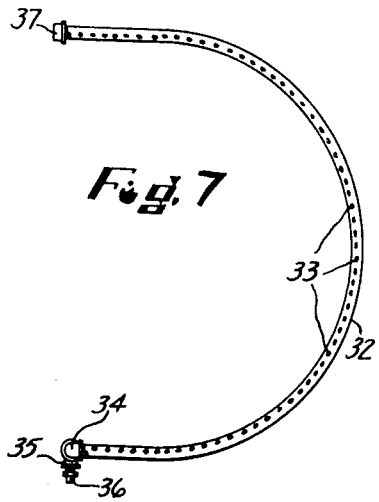
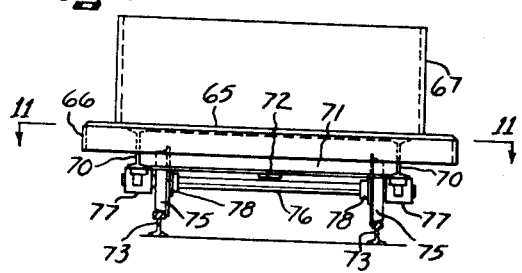
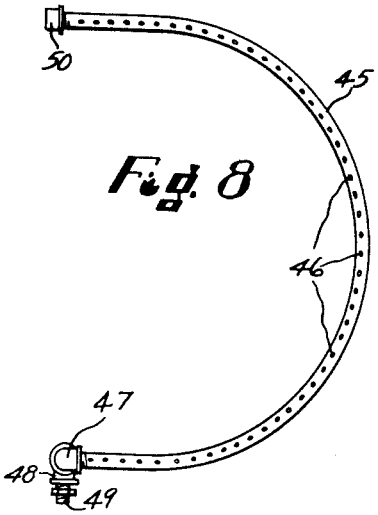
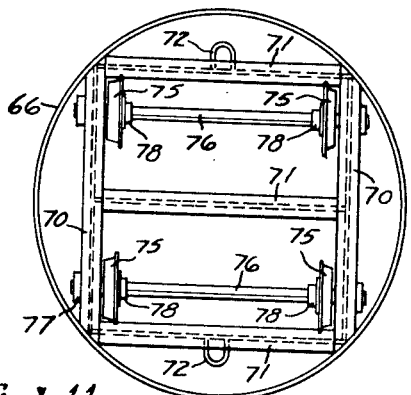
INVENTOR
JOHN J. SCOTT
BY
ATTORNEY Dec. 15, 1964 J. J. SCOTT 3,161,470
ARC FURNACE PROCESS FOR THE PRODUCTION OF ZIRCONIUM CARBIDE
Filed Feb. 25, 1958

INVENTOR
JOHN J. SCOTT
BY
ATTORNEY

Dec. 15, 1964 J. J. SCOTT 3,161,470
ARC FURNACE PROCESS FOR THE PRODUCTION OF ZIRCONIUM CARBIDE
Filed Feb. 25, 1958 5 Sheets-Sheet 5

INVENTOR
John J. Scott

BY

ATTORNEY

United States Patent Office 3,161,470
Patented Dec. 15, 1964

3,161,470
ARC FURNACE PROCESS FOR THE PRODUCTION OF ZIRCONIUM CARBIDE
John J. Scott, Willoughby, Ontario, Canada, assignor to Norton Company, Worcester, Mass., a corporation of Massachusetts
Filed Feb. 25, 1958, Ser. No. 717,374
4 Claims. (Cl. 23—208)

The invention relates to the production of zirconium carbide.

One object of the invention is to reduce the cost of synthesizing zirconium carbide. Another object of the invention is to provide a practical process for synthesizing zirconium carbide from zircon or baddeleyite when available. Another object is to provide a practical process for synthesizing silicon free zirconium carbide from fused zirconia.

Another object of the invention is to synthesize zirconium carbide especially suitable for the extraction of zirconium metal by means of an electrolytic process using a fused salt bath such as disclosed, for example in a copending application of my colleagues Guy Ervin, Jr., and H. F. G. Ueltz, Serial No. 313,171 filed October 4, 1952, now abandoned.

Another object of the invention is to produce high purity zirconium carbide in particle sizes suitable for the manufacture by sintering or the like of crucibles, cells or other bodies useful for the production of zirconium metal or otherwise in an arc furnace operation without the necessity of further treatments such as washing or crushing to fines. Another object is to produce a zirconium carbide suitable for the extraction of zirconium metal by various processes.

Another object is to provide a process of the type indicated which will readily eliminate the silica content of zircon and at the same time reduce the $ZrO_2$ and $HfO_2$ and carbonize them to the carbides, all in a single furnacing operation with large volume production. Another object is to avoid contamination of the carbide product produced. Another object is to reduce the volume of molten carbide present at any given time in the furnace available for contamination by air.

Each of zircon and baddeleyite has a minor percentage of hafnium oxide which reacts with carbon the same as does zirconium oxide, and the carbide produced has a minor percentage of hafnium carbide so that the metal produced will be zirconium with a minor percentage of hafnium, but the physical properties of zirconium and its compounds are much the same as those of hafnium and its compounds and in fact, except for special uses, these two elements are treated in chemistry as a single element, usually occurring together and herein I shall refer to zirconia, zirconium and its carbide meaning the element and compounds including the unextracted hafnium content.

This application is a continuation in part of my copending application Serial No. 455,935, filed September 14, 1954, now abandoned.

Other objects will be in part obvious or in part pointed out hereinafter.

Figure 13:
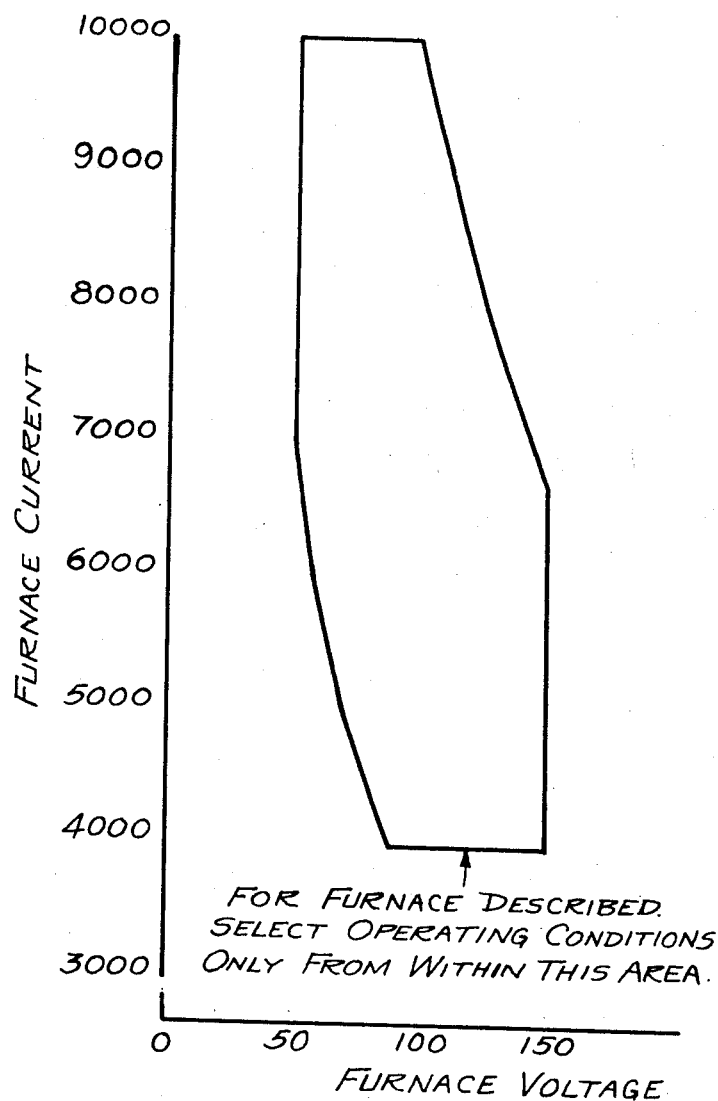
Figure 14:
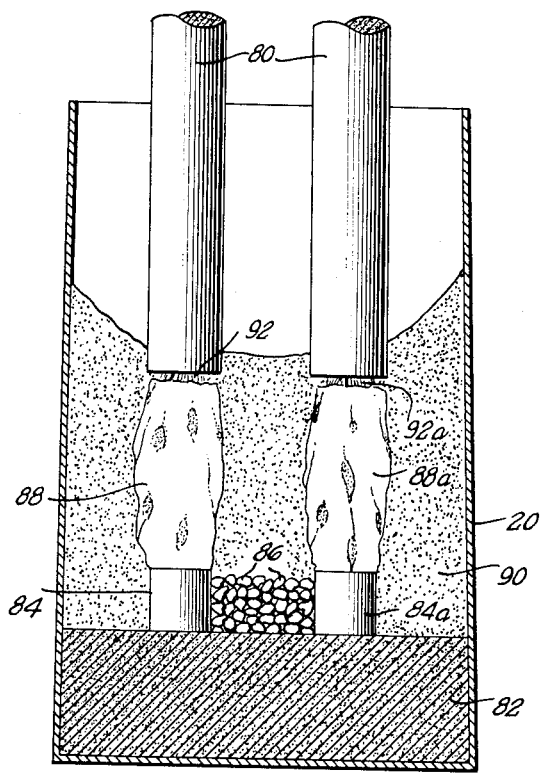

In the accompanying drawings illustrating one type of arc furnace be means of which the process of the invention can be carried out, FIGURE 1 is a front elevation of the furnace shell, FIGURE 2 is a plan view of the furnace shell, FIGURE 3 is a sectional view of the furnace shell, the section being taken along the line 3—3 of FIGURE 1, FIGURE 4 is a sectional view of the wall of the furnace shell, the section being taken along the line 4—4 of FIGURE 2, FIGURES 5 and 6 are fragmentary sectional views taken on the lines 5—5 and 6—6 respectively of FIGURE 1, FIGURES 7 and 8 are plan views of water-cooling pipes, FIGURE 9 is a front elevation of a furnace bottom truck, FIGURE 10 is a plan view of the furnace bottom truck, FIGURE 11 is a sectional view taken along the line 11—11 of FIGURE 9, FIGURE 12 is a front elevation of the furnace completely assembled, illustrating the carbon or graphite electrodes and the track upon which the wheels of the truck rest, FIGURE 13 is a graph showing the operating conditions for the furnace described, FIGURE 14 is a diagrammatic elevational view of the arc furnace in operation producing separate ingots of carbide materials under each electrode.

Referring now to FIGURES 1, 2 and 3, the furnace shell 20 can be made out of two pieces of steel plate welded together. Its shape is oval, tapering from the bottom to the top, and the shape is sufficiently indicated in FIGURES 1, 2, and 3. As shown in FIGURES 1, 4, and 5 at the top of the shell 20 is welded a lip 21 to which is welded a depending skirt 22. At the bottom of the shell 20 is a large flange 23, which also can be made of steel plate and welded to this flange 23 is a depending skirt 24. As clearly shown in FIGURE 3 the outer contour of the flange 23 is circular while the inner contour is oval; the flange 23 is welded to the shell 20. Steel ribs 25, 26, 27, and 28 are welded to the shell 20 and to the flange 24 and serve to give this unit greater strength.

Hooks 30 made of steel plate are welded to the outside of the shell 20, near the top, at opposite ends of the long axis of the oval. These hooks 30 can be engaged by the hooks of chain falls connected to an overhead hoist, not shown, for the purpose of lifting the unit comprising the shell off the product of the fusion when the latter has cooled sufficiently.

A pair of bent pipes 32, one of which is shown in FIGURE 7 and the other of which is identical therewith except that it is of the opposite hand, are provided with very fine holes 33 which are preferably located (when the pipes 32 are in place as shown in FIGURES 4 and 5) to throw water upwardly and inwardly; for example they can be 30° from the top and on the inside as illustrated. At one end of each pipe 32 is a pair of elbows 34 and 35 connected to each other and to a nipple 36. At the other end of each pipe 32 is a cap 37 to plug the free end of the pipe whereby to compel the water to issue through the holes 33. The pipes 32 can be supported under the lip 21 in any manner; as illustrated in FIGURES 2 and 5 it will suffice to provide four bolts 40 extending through the lip 21 upholding bars 41 by means of nuts 42, and the pipes 32 simply rest upon the bars 41.

FIGURE 8 illustrates one of a pair of bent pipes 45, of which one is as shown and the other is of the opposite hand, and these pipes 45 have holes 46 and are equipped with elbows 47 and 48 and a connecting nipple 49 on one end, and caps 50 on the other end. As shown in FIGURES 1 and 6 these pipes can be supported close to the shell 20 by means of lugs 52 welded to the outside of the shell 20 together with bent bolts 53 passing through pipe sleeves 54 welded to the lugs 52, and with nuts 55 to draw the bent bolts firmly against the pipes 45. Illustratively the holes 46 can be oriented as shown in FIGURE 6, but this is not critical so long as they are located to throw the water inwardly since at the locus of pipe 45 there is already a cascade of water.

The pipes 32 and 45 are, of course, connected to water supply as by means of hoses 57, 58, 59, and 60 illustrated in FIGURE 12, so that at all times when the power is on, the shell 20 is cooled by a cascade of water. Although the synthesis of zirconium carbide takes place at about 3000° C. and above and steel plate melts at around 1500° C., the cascade of water over the shell 20 coupled with the fact that steel is highly thermally conductive protects the shell 20 from melting. The cascade of water hugs the surface of the shell 20 and covers all parts of it from the top down and is assisted in so doing by the taper of the shell. Also it may be remarked that the shell 20 quickly acquires a coating of rust, which is easily understood since it is alternately wet and dry and frequently quite hot, and the rust makes it much more wettable than clean, unrusted steel.

Referring now to FIGURES 9 and 10, the furnace bottom truck comprises a circular table 65 made of steel plate to which is welded a depending skirt 66 also made of steel plate. To the upper surface of table 65 is welded an oval bottom container 67 made of steel plate. This oval bottom container 67 has the same shape as the bottom of the shell 20 as shown in FIGURE 3, but the oval container 67 is slightly smaller in size so that the shell 20 and flange 23 can be placed over the container 67 and on the table 65. As shown in FIGURE 12, when the shell 20 is placed on the bottom with the flange 23 on the table 65, a hose 69 is interposed to act as a seal. This hose 69 is a plain piece of rubber hose without couplings or other fittings and simply acts as a cushion and sealing means, and extends all the way around the table 65 with the ends thereof overlapping.

Referring now to FIGURES 9 and 11 a pair of parallel steel I beams 70 are welded to the bottom of the table 65 and a plurality of I beams 71, for example three of them, are also welded to the bottom of the table 65. These I beams 71 are desirably perpendicular to the I beams 70. To the outer I beams 71 are welded U-shaped bars 72, for the purpose of connecting a hook of a chain to the truck to draw it along the track 73 illustrated in FIGURE 12.

Resting upon the track 73 are four flanged wheels 75 on steel axles 76 journalled in bearing boxes 77 which can be iron castings. The wheels 75 are located between the bearing boxes 77 and collars 78 on the axles 76. The bearing boxes 77 are welded to the under sides of the steel I beams 70.

Practical dimensions for the furnace described are, height of shell 20 about nine feet, other dimensions in proportion, and such a furnace can hold about 20,000 pounds of mixture and zirconium carbide made therefrom.

A typical zircon ore has the following composition:

TABLE I

| | Percentage by weight |
|---|---|
| Zirconia, $ZrO_2$ | 65 to 67. |
| Silica, $SiO_2$ | 32 to 34. |
| Iron oxide, calculated as $Fe_2O_3$ | 0.01 to 0.30. |
| Titania, $TiO_2$ | 0.02 to 0.30. |
| Alumina, $Al_2O_3$ | Less than 1.0. |
| Other matter, apart from hafnia, $HfO_2$ | Trace. |

I use for a charge in the electric arc furnacing operation a mixture of the zircon ore, coke and reclaim material from a previous furnacing operation if I have any on hand that I consider of sufficiently high grade. In a furnacing operation according to the invention there is some material which is not converted to zirconium carbide or is only partially converted and this is what I call reclaim material. The unconverted material is called sweepings as it falls to the floor when the furnace shell 20 is removed and the partly converted material which is found sintered around the outside of the pig is called refuse. The zircon ore, zirconium oxide ore, and the unconverted material are generically referred to as zirconium oxide ore. Also included in this expression "zirconium oxide ore" is fused zirconia made from crude ore by reduction in the electric furnace with insufficient carbon to carbonize it. I can use fused zirconia on hand but there is little point in making it deliberately for this process as this is simply doing in two electric furnace operations what can be done in one. Nevertheless a purer carbide can be made that way.

I provide a mixture of zirconium oxide ore and coke in proportion of from 30% deficiency of free carbon in the coke to 50% excess free carbon in the coke of the stoichiometric proportion for the complete reduction of the ore and for the complete carbonization of the zirconium and hafnium components to ZrC and HfC. The ideal equation is $$ZrO_2 \cdot SiO_2 + 5C = ZrC + Si + 4CO$$

But as I use reclaim material my zirconium oxide ore is rarely exactly $ZrO_2 \cdot SiO_2$ (zircon). The silicon volatilizes and not a great deal of it is found in the final product, being mostly carbide SiC. Thus I can calculate the mass of the ore on hand including the reclaim material, calculate the percentage of oxygen and by atomic weights calculate the amount of carbon required to combine with the oxygen to form CO, then the amount of additional carbon required to carbonize the Zr to ZrC, then increase this by 50% or decrease this by 30% or use any figure between these limits. Of course the free carbon content of the coke is figured to find out the actual amount of coke to add. Free carbon content of coke determination is well known in the art and is done by analytical methods. The Hf content can be figured as Zr as there is such a small amount of Hf. However, it is more accurate to estimate the proportion of Hf and use the atomic weights of both Zr and Hf in the proportion found.

Explaining the above more fully, since the theoretical amount of free carbon required to reduce $ZrO_2 \cdot SiO_2$ to ZrC and SiC is 39.4% of the mass of the $ZrO_2 \cdot SiO_2$, 50% excess of carbon is 59% of the mass of the $ZrO_2 \cdot SiO_2$, and 30% deficiency is 27.6% of the mass of the $ZrO_2 \cdot SiO_2$. Furthermore as I usually use some reclaim material which has less than one molar proportion of $SiO_2$ to $ZrO_2$, it is more correct to state that I prepare a mixture of zirconium oxide ore and coke in proportion of from 30% deficiency of free carbon in the coke to 50% excess free carbon in the coke of the stoichiometric proportion for the complete reduction of the $ZrO_2$ content of the ore and for the complete carbonization thereof to ZrC and SiC.

I prefer to use a well calcined coke principally because the amount of free carbon therein can be determined with more accuracy. I can use various kinds of coke, petroleum coke, metallurgical coke and pitch coke, but in general I find pitch coke is more uniform in quality and this usually has about 90% free carbon and is low in ash content, below 1%. I prefer to select coke having less than .5% ash content.

The zircon ore is intimately mixed with the coke and is further intimately mixed with the reclaim material. I can use coarse ore and/or coke or fine ore and/or coke, but the finer the particle sizes the quicker and more complete is the reaction. The sweepings are used as they come, being fine material. The refuse is crushed to particles usually not larger than ¼ inch lumps. The coke can be used as it comes, which is from ½ inch lumps to very fine particles. I can use 100% reclaim material (apart from the coke) or any proportion thereof relative to the total zircon material.

Before assembling the shell 20 and the bottom container 67, I form a carbon bottom in the container 67 in any suitable manner, such as by tamping in a mixture of fine carbon and pitch. This carbon bottom should be concave on the top and on the periphery should extend to the top of the container 67. After assembly of the shell 20 and bottom container 67, I pack reclaim material and/or ore between the outside of the container and the inside of the shell and then add more thereof to the shell 20 to extend to a rather uniform level about four inches above the top of the container 67 (assuming a nine foot high shell 20). This is also a bottom.

I now place a mass (for example about 75 pounds) of lump graphite or carbon right under the eventual loci of the electrodes 80 (see FIGURE 12) in which, when the furnace has been moved to operating position, are the foci of the oval of the shell 20. Electrically connecting these masses of carbon or graphite (termed carbon) I build a bridge of graphite or carbon with this lump material which bridge extends from one locus to the other locus. I form a trough in the reclaim material and/or ore for the lumps.

The bridge of graphite lumps forms a continuous electric current path from the area under one electrode to the area under the other electrode and the cross section of this path is preferably about fifty square inches for the large furnace described. Maximum and minimum permissible cross section of the bridge will be discussed hereinafter. I energize the electrodes 80 at an E.M.F. of from 50 to 150 volts, preferably 130 volts and then, having moved the truck on the track 73 to place the shell 20 in the proper position as above defined, I lower the electrodes into contact with the graphite. During the entire process the electric current flows through the bridge.

The electrodes are controlled by the usual overload underload "servo" controlling mechanism and electric motor powered lifting and lowering mechanism, together with a circuit breaker to protect the electrical equipment. Since such electrical mechanisms are known and belong to an art other than the art of producing zirconium carbide, they will not be described herein.

When the electrodes 80 contact the bridge of graphite electric current flows at about 4000 amperes or more. The "servo" mechanism causes the electrodes 80 to hunt up and down maintaining the arcs with a current flow (when the E.M.F. is 130 volts) of about 6150 amperes.

Now I shovel mixture all over the area of the furnace to a depth of about two inches. Some mixture gets right into the loci of the arcs and there the reaction takes place, forming zirconium carbide and releasing suboxides of silicon and carbon monoxide. The conditions are reducing and the blanket of mix keeps the air away from the zone of reaction in the loci of the arcs. While it is preferable to have the blanket of mixture about one inch minimum depth (measuring from the bottoms of the electrodes) in some cases I can operate without any blanket at all. Any blanket of mix should not be more than about three inches as I want the *gasses* to escape.

It now suffices to charge the furnace from time to time with mixture. The mix should be banked high all around the inside of the shell 20. For example, it might be four inches higher at the shell than at the electrodes, and even higher, up to a foot higher at the ends of the long horizontal axis of the shell 20.

As mixture is fed from time to time into the furnace, the electrodes gradually rise as ingots of zirconium carbide are formed in the loci of the arcs. No considerable pool of molten zirconium carbide is formed; the reaction produces a zirconium carbide which is incandescent and some liquid phase may exist but for the most part the liquid phase is momentary only.

The operation of the furnace part way through a run as described above is illustrated in FIG. 14, which shows the base layer 82 of ore, reclaim material or comparable material supporting the large lumps 84 and 84a of graphite or carbon under the loci of the electrodes 80. Between the carbon lumps 84 and 84a is the bridge of graphite or carbon lumps 86 and extending substantially between the bottom of each electrode 80 and the corresponding large carbon lump 84 or 84a are the fused ingots 88 and 88a of carbide material. Surrounding the bottom ends of the electrodes 80, ingots 88 and 88a and carbon bridge formed of lumps 84, 84a and 86 is the mass of reaction mixture 90, which as exampled above will rise higher and higher in the shell 20 as the production run proceeds. The path of electric current during the operation is from one electrode 80 via an arc 92, through the ingot 88, the lump 84, then the lumps 86, next the lump 84a, then the ingot 88a, and finally through the arc 92a to the other electrode.

When the run has been completed, and the electrodes lifted, it is convenient to draw the truck along the rails 73 to remove the entire furnace from under the electrodes so that, for example, another similar furnace may be set up underneath them to start another run of the process. However, for a long time the cascade of water is maintained on the shell 20, preferably at least through the hoses 57 and 58 to the pipes 32. This cascade of water is maintained until the contents of the shell 20 has cooled sufficiently so that there is no more danger of burning the shell. Usually this takes about sixteen hours. The furnace shell is not lifted until the contents have cooled sufficiently so that the carbide will not oxidize when it comes into contact with the air. In a 2000 lb. furnace shell this is about 40 hrs. from the time the furnace is shut down. At the end of that time, the furnace shell is lifted off the ingots and what is now reclaim material, most of which forms a loosely sintered mass. Two ingots of zirconium carbide are found embedded in the mix. The ingots are carefully separated from what is now reclaim material and the latter is collected for use in a subsequent run of the process.

*Example I*

Using a furnace the shell 20 of which was 38 inches high instead of the furnace recommended, which 38 inch high shell will hold approximately 1500 lbs. of this material, this fifteen hundred pound furnace being, however, of the same shape and proportions and having the same parts as the twenty thousand pound furnace described, I synthesized one hundred and seventy-one pounds of zirconium carbide as follows:

The charge was 275 lbs. of pitch coke and 725 lbs. of zircon sand. The grains of the pitch coke were of about the size of grains of rice and had a free carbon content of about 90%. The zircon sand was the zircon ore of Table I and had a particle size as shown in the following table.

TABLE II

On screen of meshes per linear
| inch as given: | Percentage by weight |
| --- | --- |
| 72 | .13 |
| 90 | 2.93 |
| 100 | 35.80 |
| 110 | 7.80 |
| 120 | 10.47 |
| 140 | 33.50 |
| 160 | 4.73 |
| 180 | 3.93 |
| 210 | 0.00 |
| 255 | 0.17 |
| Through 255 | 0.20 |
|  | 99.66 |
| Loss | 0.34 |
|  | 100.00 |

My assistants under my direction then prepared the furnace bottom as already described by charging it with zircon sand and then laid down the graphite masses and built the graphite bridge which was four inches wide and about two inches deep. The two graphite electrodes were four inches in diameter.

The furnace was started under an electromotive force of 100 volts with a power input of 200 kw. giving an average current of 2000 amperes. The furnace was fed as described until all of the thousand pounds of charge (mix) had been fed thereinto. We kept the blanket or cover of mix at about one inch. Of course this is an estimate since the contents of the shell emits tremendous illumination at the temperatures involved. This run took five hours and ten minutes.

The yield was 171 pounds of zirconium carbide having an anlysis as follows.

TABLE III

| Element: | Percentage by weight |
|---|---|
| Zr+Hf | 81.60 |
| C | 12.53 |
| Si | 4.38 |
| Ti | 0.08 |
| | 98.59 |

Of the 1.41% unaccounted for, there was so little iron to start with that little could be present in the final product. Iron readily volatilizes at the high temperatures involved. Aluminum also volatilizes and there will be little thereof in the final product, there being not much to start with. Most of the 1.41% was undoubtedly oxygen.

The ingots, one under each graphite electrode, were roughly cylinders with cracks. Each ingot was broken up with sledges and then crushed to produce lumps of various sizes, many an inch or two in longest dimension. Whatever is done with this material after this point is no part of the present invention. The material, however, is well suited for the uses mentioned in the objects.

This run, besides producing 171 pounds of zirconium carbide yielded 378 lbs. of reclaim material mostly sweepings useful for further production of ZrC. Some of the zirconium content was lost in dust. In a large scale operation a dust collector is used to recover most of the dust.

*Example II*

In this example the mass of the charge, the electromotive force, the power in kilowatts, the zircon, the coke, the manner of feeding the furnace, were all the same as in Example I. However, the proportion was .396 free carbon to the mass of the zircon giving 695 lbs. of zircon and 305 lbs. of pitch coke. This run took five hours and ten minutes also. The yield was 174 lbs. of zirconium carbide having an analysis of:

TABLE IV

| Element— | Percentage by weight |
|---|---|
| Zr | 80.40 |
| C | 16.04 |
| Si | 2.58 |
| Fe | Trace |
| Ti | 0.08 |
| | 99.10 |

The balance of .90 was probably mostly oxygen and analytical error. Quantitatively there was considerably less oxygen in the material of Example II than there was in the material of Example I. The ingots were broken up and crushed as in Example I. This ZrC was better grade material for the uses mentioned in the objects since more of the oxygen was eliminated. The percentage of Zr in ZrC is 88.3 and the percentage of carbon therein is therefore 11.7. It is noted that for the purposes indicated in the objects, excess of carbon is not detrimental since, in the production of zirconium metal by electrolysis in a fused salt bath the carbon will not deposit on the cathode.

In this run the reclaim material weighed 235 lbs., all available for subsequent use.

*Example III*

In this example the mass of the charge, the electromotive force, the power in kilowatts, the zircon, the coke, the manner of feeding, the furnace, were all the same as in Examples I and II. However, the proportion was .432 free carbon to the mass of the zircon giving 678 lbs. of zircon and 322 lbs. of pitch coke. This run took five hours and ten minutes. The yield was 153 lbs. of zirconium carbide having an analysis of:

TABLE V

| Element— | Percentage by weight |
|---|---|
| Zr | 79.48 |
| C | 16.73 |
| Si | 2.89 |
| Fe | 0.007 |
| Ti | 0.04 |
| | 99.15 |

The balance of .85 was probably mostly oxygen and analytical error. In any event there was little oxygen in the product. The ingots were broken up and crushed as in the other examples providing a high grade material for the uses mentioned. In this run the reclaim material for subsequent use weighed 270 lbs.

Using the large furnace described having the nine feet high shell 20, I made a total of sixteen runs producing a total of 35,685 lbs. of zirconium carbide material. These runs were made with 40% reclaim material and 60% of zircon sand and petroleum coke. Usually the carbon factor was .396 meaning that the amount of coke plus the amount of carbon in the reclaim material was calculated to yield free carbon to the amount of .396 times the amount zircon in the total charge. This carbon factor was in two cases .344, in others .396. The carbon factor .344 represents 12.8% carbon less than the stoichiometric proportion of the equation:

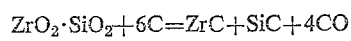

$$ZrO_2 \cdot SiO_2 + 6C = ZrC + SiC + 4CO$$

The carbon factor .396 represents 1% carbon more than said stoichiometric proportion which is .393.

Using the large furnace and the carbon factor .396, the charge was 16,200 lbs. composed of 40% reclaim material, 45% zircon sand as previously described and 15% petroleum coke. This coke had 87.33% free carbon and had a particle size just a little finer than the pitch coke mentioned. The bottom of the furnace was packed with 600 lbs. of zircon sand in the manner described and the graphite bridge was built as specified. The feeding of the charge, which was a thorough mixture of the ingredients, was done as above explained. The electromotive force was 130 volts, the average power input was 787 kw. The run lasted for 15 hours 15 minutes. The yield was 2093 lbs. of material analysing as follows:

TABLE VI

| Element: | Percentage by wt. |
|---|---|
| Zr+Hf | 77.90 |
| C | 18.56 |
| Si | 2.07 |
| Ti | 0.06 |
| Fe | Trace |
| | 98.59 |

The balance of 1.41 was probably mostly oxygen. This material is good starting material for the extraction of metallic Zr+Hf by various processes including those mentioned herein.

*Example IV*

This was one of the sixteen runs in the large furnace. I used 40% reclaim material and 60% zircon sand and petroleum coke. The carbon factor was .396. The charge was 20,400 lbs. The coke had 87.33% free carbon and was the same as in Example III. The bottom was prepared as in Example III and the feeding was as in Example III and as previously described. The electromotive force was 130 volts and the average power input was 793 kw. The run lasted for 19 hours. The yield was 3489 lbs. of material analysing as follows.

TABLE VII

| Element: | Percent by wt. |
|---|---|
| Zr+Hf | 79.51 |
| C | 16.40 |
| Si | 2.24 |
| Ti | 0.13 |
| Fe | 0.20 |
| | 98.48 |

The balance of 1.52 was probably mostly oxygen. This material likewise is good starting material for the extraction of Zr+Hf by various processes.

The other fourteen runs in the large furnace gave comparable results. All of the 35,685 lbs. of zirconium carbide produced is good material for the extraction of Zr+Hf metal. The zirconium content predominates.

One of the especial features of the present process is having an electrically conductive path for the current between the arcs consisting of two ingots of zirconium carbide separately formed under the electrodes plus the graphite bridge underneath the ingots. When finally the furnace has been filled with mixture to the brim, the power is cut off and electrodes are raised. Of course the cascade of water was flowing over the furnace shell 20 at all times during the run of the process.

Another feature of the invention is the layer of zircon or reclaim material below the graphite or carbon bridge. This serves as an insulating layer to prevent short circuiting of the electric current path.

With regard to the electrical parameters, I have not found it practical to use higher than 150 volts and under 50 volts it is difficult to make a satisfactory product in reasonable quantity.

The important parameters in this invention are the parameters of the electromotive force, the proportion of free carbon in the mix and the parameters of the bridge. With regard to the latter, the cross section of the bridge is the criterion, since the bridge length is simply determined by the fact that it extends from under one electrode to under the other electrode, referred to as the loci of the electrodes.

The important feature of the cross section of the bridge is its area since the shape can vary widely within reason. This area is given as a function of the electrode diameter as I know of no other practical way to state it. The electrode diameter can be almost anything depending upon the size of the furnace. If the electrode is square, triangular or some other shape in cross section its "diameter" is taken as a function of its area $A$ as if it were a circle. The diameter $D$ of any circle is equal to $$2\sqrt{\frac{A}{\pi}}$$

and for any figure the effective diameter $D$ can be found by the equation $$D=2\sqrt{\frac{A}{\pi}}$$

Now if $D$ is the diameter of the electrodes and $C$ is the area of the cross section of the bridge in inches and square inches respectively, I find that the minimum value of $C/D$ is 2 and the maximum value of $C/D$ is 12. Thus I can state the bridge cross section by the formulae $$C/D \not< 2 \text{ and } C/D \not> 12$$

In the practice of my invention I prefer to use the oval shell and two electrodes with single phase power. However three phase power could be used with three electrodes and then the shell should be trilobed or round.

The arc furnace process described, synthesizing zirconium carbide, consumes far less pounds of electrode for every pound of production than does the resistance furnace process of the patent to Ridgway No. 2,237,503.

I do not have exact figures but am confident that the electrode consumption of my arc furnace process is less than one tenth of that of the resistance furnace process per unit of product. Also my arc furnace process uses substantially less power per unit of production than does the resistance furnace process of Patent No. 2,237,503. Furthermore the production rate of my arc furnace process is much greater than that of the resistance furnace process.

The furnace shell 20, the table 65 and the oval bottom container 67 are stated to be made of steel. Steel is a variety of iron and other varieties of iron could be used, and also other metals could be substituted. Mixtures of two or more of the refractory materials alumina, titania, and zirconia could be used for the furnace bottom under the carbonaceous bridge. The electrodes used were cylindrical in shape, but rod like electrodes of non-circular cross section could be used. The ends of the graphite bridge covered the entire areas under the areas of the electrodes and this is preferable.

The process of the invention described herein is surprising when it is considered that the melting point of zirconium carbide is 3532° C. while the boiling point of zirconium metal is 2900° C. As there is no lid on the furnace one could expect the material to boil off when it has been reduced to the elemental stage. For it is obvious that you cannot go from $ZrO_2$ to $ZrC$ without passing through the stage $Zr$.

By free carbon I mean available carbon, that is available for reduction of the ore as distinguished from volatile carbon in hydrocarbons, etc. Free carbon is referred to by many as fixed carbon. Since graphite is a form of carbon and since amorphous carbon can be used for the bridge as well as graphite, in the claims the expression "bridge of carbon" or the like is to be construed as covering a bridge of graphite or a bridge of amorphous carbon.

In the patent to R. R. Ridgway, No. 2,285,837, a process of producing carbides, including zirconium carbide, in an arc furnace is described. In this Ridgway process a molten pool of the carbide is formed, as shown in the drawings and as stated on page 3 left hand column line 9. This was found to cause reoxidization of the carbide resulting in a low grade product. The theory that the use of a deep furnace would avoid oxidization and nitriding was valid only in part. By avoiding the formation of any substantial pool of molten carbide, the process herein described is a much more practical arc furnace method of making zirconium carbide and produces a better product.

Further details of the operating conditions for a furnace of the size illustrated and described which also hold for furnaces of about the same size with electrodes approximately as described are as follows:

The first adjustment to be made when the furnace is ready to start is to set the voltage at a suitable value. The range of voltages that can be used with the furnace noted above is from 50 to 150 volts; the recommended value for best operation being 130 volts. The adjustment is the current level. The current controller raises or lowers the electrodes automatically to maintain a predetermined current. The range of currents that can be used is from 4,000 to 10,000 amperes, the optimum value being 6,150 amperes. Under optimum conditions, this size and type of furnace therefore runs at 130 volts and 6,150 amperes, corresponding to a total input of 800 kva. This type of furnace runs at a power factor sufficiently close to unity for us to speak of kva. and kw. interchangeably, so I shall call this 800 kw.

The ranges of voltage and current noted above still do not specify completely the possible operating conditions. For example 150 volts at 10,000 amperes would cause erratic furnace operation while 50 volts and 4,000 amperes would reduce the rate of production to an uneconomically low level. A further limitation must therefore be placed on the operation, restricting the power level to the range from 350 to 1000 kw. FIGURE 13 shows graphically the permissible operating conditions.

The discussion above describes a comparatively wide range of power levels, roughly three to one. It is to be expected that the resulting product will differ in some respects, depending on the particular set of operating conditions selected, and this expectation is borne out by experience. For one thing, the power level will determine the diameter of the twin ingots that grow in the furnace. Thus, at the lower limit of 350 kw. the ingots will be about 14 inches in diameter, and at the upper limit of 1000 kw. they can be up to 24 inches in diameter. Since the electrodes are spaced 24 inches center to center, the latter figures represent a limiting condition under which the ingots begin to touch each other at some points. For another thing, the power level will influence the rate at which the ingots grow vertically. However, this rate of growth is taken care of automatically providing the raw materials are fed to the furnace at the specified rate, which I shall now discuss.

Probably the most important single consideration in the operation of the furnace is the control of the process of reaction and incipient fusion that makes it possible to grow ingots without at any time forming a molten pool of product in the bottom of the furnace. This process is controlled by feeding the raw materials to the furnace at a predetermined rate. Thus the feed rate must be held between 0.4 and 0.8 lb. of raw mix per kwh. As an example, if the furnace is run at a power level of 1,000 kw., the total energy used in one hour is 1000 kwh. It will therefore be necessary to feed the raw mix to the furnace at a rate between 400 and 800 lbs. per hour. Since by no means all the feed is reacted in any one run, the overall consumption of electrical energy by the process is 4–6 kwh. per lb. of product.

It will thus be seen that there are as many distinct ingots of zirconium carbide as there are electrodes, and that the ingots are maintained substantially clear of each other so that the major path of the electric current after the process has been started is from one electrode to another electrode, via first an electric arc between an electrode and the zirconium carbide ingot under it, then through a mass of carbon, then through the bridge, then through another carbon mass, then through another zirconium carbide ingot and finally through an electric arc to the electrode directly above the ingot.

It will thus be seen that there has been provided by this invention a process for the production of zirconium carbide in which the various objects hereinafter set forth, together with many thoroughly practical advantages are successfully achieved. As many possible embodiments may be made of the above invention and as the art herein described might be varied in various parts, all without departing from the scope of the invention it is to be understood that all matter hereinabove set forth or shown in the accompanying drawings is to be interpreted as illustrative and not in a limiting sense.

I claim:

1. The process of synthesizing zirconium carbide by the reaction of zirconium oxide ore and coke in an electric arc furnace while maintaining reducing conditions at the zones of reaction, which comprises forming in an electric arc furnace having vertically movable electrodes a furnace bottom of refractory oxide material, placing a mass of carbon above said bottom at the eventual locus of each electrode, forming a bridge of carbon above said bottom electrically connecting said masses, maintaining said bridge of carbon at all times during the process, placing said electrodes at said loci in electrical contact with said masses of carbon and energizing said electrodes at from 50 to 150 volts, maintaining during the process a mixture of said zirconium oxide ore and coke around the bottoms of said electrodes and forming thereby as many distinct ingots of zirconium carbide as there are electrodes, one ingot under each electrode, feeding said mixture of zirconium oxide and coke to around the bottoms of said electrodes at the rate of from 0.4 to 0.8 lb. of mixture per kwh. of electrical energy energizing said electrodes, and maintaining the said ingots clear of each other whereby the path of the electric current after the process has been started is always from one electrode to another electrode, via first an arc, then through a zirconium carbide ingot synthesized by the process, then through one of said masses of carbon, then through the bridge, then through another of said masses of carbon, then through another zirconium carbide ingot synthesized by the process, then by an arc to another electrode, and building up the zirconium carbide ingots synthesized by the process under the electrodes without the formation of any considerable pool of molten zirconium carbide as the electrodes gradually rise during the process by reason of the energization of the electrodes at 1 kwh. for each 0.4 to 0.8 lb. of mixture fed.

2. Process according to claim 1 in which the cross section of the bridge in square inches divided by the diameter of the electrode in inches is between 2 and 12.

3. Process according to claim 2 in which the oxide material of the furnace bottom is mainly zircon.

4. Process according to claim 1 in which the oxide material of the furnace bottom is mainly zircon.

References Cited by the Examiner

UNITED STATES PATENTS 2,285,837  6/42  Ridgway _____ 23—208

MAURICE A. BRINDISI, *Primary Examiner.*